(12) United States Patent
Frey

(10) Patent No.: US 9,064,805 B1
(45) Date of Patent: Jun. 23, 2015

(54) HOT-PRESS METHOD

(71) Applicant: ITN Energy Systems, Inc., Littleton, CO (US)

(72) Inventor: Jonathan Mack Frey, Denver, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 0 days.

(21) Appl. No.: 14/210,028

(22) Filed: Mar. 13, 2014

Related U.S. Application Data

(60) Provisional application No. 61/779,241, filed on Mar. 13, 2013.

(51) Int. Cl.
*B23K 31/02* (2006.01)
*H01L 23/00* (2006.01)
*B23K 1/00* (2006.01)

(52) U.S. Cl.
CPC .............. *H01L 24/29* (2013.01); *B23K 1/0016* (2013.01); *B23K 2201/36* (2013.01)

(58) Field of Classification Search
None
See application file for complete search history.

(56) References Cited

U.S. PATENT DOCUMENTS

| | | | |
|---|---|---|---|
| 3,919,709 A * | 11/1975 | Koenig | 257/734 |
| 4,607,779 A * | 8/1986 | Burns | 228/106 |
| 4,610,081 A * | 9/1986 | Triner | 29/623.1 |
| 5,390,845 A * | 2/1995 | McDonald | 228/217 |
| 5,511,719 A * | 4/1996 | Miyake et al. | 228/106 |
| 5,921,460 A * | 7/1999 | Topping et al. | 228/111.5 |
| 6,386,426 B1 * | 5/2002 | Tadauchi et al. | 228/117 |
| 7,398,912 B2 * | 7/2008 | Shinkai et al. | 228/122.1 |
| 7,625,666 B2 * | 12/2009 | Shose et al. | 429/162 |
| 8,247,683 B2 * | 8/2012 | Frey et al. | 136/255 |
| 8,348,139 B2 * | 1/2013 | Liu et al. | 228/246 |
| 8,513,806 B2 * | 8/2013 | Otsuka et al. | 257/751 |
| 8,598,707 B2 * | 12/2013 | Maeda et al. | 257/772 |
| 2002/0068221 A1 * | 6/2002 | Watanabe et al. | 429/231.5 |
| 2003/0098339 A1 * | 5/2003 | Totani et al. | 228/175 |
| 2003/0121142 A1 * | 7/2003 | Kikuchi et al. | 29/623.4 |
| 2003/0205610 A1 * | 11/2003 | Miyake et al. | 228/223 |
| 2004/0026769 A1 * | 2/2004 | Nakamura | 257/686 |
| 2007/0154808 A1 * | 7/2007 | Konishiike et al. | 429/211 |
| 2008/0023530 A1 * | 1/2008 | Kemper | 228/179.1 |
| 2008/0090146 A1 * | 4/2008 | Batson | 429/200 |
| 2008/0220313 A1 * | 9/2008 | Zerfass et al. | 429/36 |
| 2009/0325023 A1 * | 12/2009 | Kusnezoff et al. | 429/30 |
| 2010/0102429 A1 * | 4/2010 | Tzu | 257/690 |
| 2010/0246099 A1 * | 9/2010 | Naka et al. | 361/534 |
| 2010/0285331 A1 * | 11/2010 | Kitahara et al. | 428/650 |
| 2010/0310929 A1 * | 12/2010 | Nakai et al. | 429/185 |
| 2010/0310964 A1 * | 12/2010 | Zerfass et al. | 429/469 |
| 2011/0101076 A1 * | 5/2011 | Ogaki et al. | 228/244 |
| 2011/0194255 A1 * | 8/2011 | Yamashita et al. | 361/711 |
| 2011/0269054 A1 * | 11/2011 | Hasz | 429/479 |
| 2011/0297433 A1 * | 12/2011 | Kuramoto et al. | 174/263 |
| 2012/0018493 A1 * | 1/2012 | Baffie et al. | 228/121 |
| 2012/0045869 A1 * | 2/2012 | Gaynes et al. | 438/107 |
| 2012/0248094 A1 * | 10/2012 | Strotmann et al. | 219/616 |

(Continued)

*Primary Examiner* — Kiley Stoner
(74) *Attorney, Agent, or Firm* — George C. Lewis; Merchant & Gould P.C.

(57) ABSTRACT

Systems and methods are described for combining two or more thin-film electronic devices use a hot-press method. Two or more thin-film batteries, electrochromic devices, and/or a fuel cells may be combined. A thin-film conductive substrate is positioned between the thin-film electronic device. Sufficient heat is applied to the thin film conductive substrate and/or the connecting surface of the one or more devices to cause a material, such as lithium, to flow and bind the thin-film electronic devices together.

18 Claims, 4 Drawing Sheets

(56) References Cited

U.S. PATENT DOCUMENTS

| | | | | |
|---|---|---|---|---|
| 2012/0305298 A1* | 12/2012 | Uang et al. | .................... | 174/257 |
| 2013/0011717 A1* | 1/2013 | Yotsumoto | .................... | 429/153 |
| 2013/0189022 A1* | 7/2013 | Elliot et al. | .................. | 403/230 |
| 2013/0241069 A1* | 9/2013 | Nakamura et al. | ............ | 257/762 |
| 2013/0256390 A1* | 10/2013 | Yamaguchi et al. | ....... | 228/262.5 |
| 2014/0197227 A1* | 7/2014 | Elliot et al. | .................... | 228/121 |
| 2014/0231491 A1* | 8/2014 | Yamashita et al. | ........... | 228/176 |
| 2014/0234732 A1* | 8/2014 | Park et al. | ..................... | 429/405 |

* cited by examiner

HOT-PRESS METHOD

CROSS-REFERENCE TO RELATED APPLICATIONS

This application claims priority to, and the benefit of, U.S. Provisional Patent Application No. 61/779,241 filed Mar. 13, 2013, the disclosure of which is hereby incorporated by reference herein in its entirety.

INTRODUCTION

This application generally relates to the field of manufacturing thin-film electronic devices. Thin-film electronic devices may be devices that have a substrate (such as a polymer, glass, or ceramic) and have one or more layers deposited onto the substrate. Certain layering techniques may be used to form a variety of functional devices such as solid-state batteries (e.g., solid-state lithium batteries), solar panels, and electrochromic devices. For example, thin-film batteries are often monolithically integrated meaning they are manufactured by the depositing various material onto the surface of a thin substrate. The pattern, order, and material of this deposition determine the properties of the thin-film device. Through various fabrication techniques it is possible to make a solid-state battery composed of thin layers of materials, some only nanometers or micrometers thick, to form a finished battery that can be millimeters thick or smaller. These solid-state batteries are referred to as thin-film batteries.

In certain applications, it may be desirous to combine two or more of these devices through physical means to create architectures for these devices. Embodiments discussed herein include hot-press methods along with systems and devices to perform these methods, as well as the devices created by the methods. These methods include the use of heat and physical means to adhere two devices together.

It is with respect to these and other considerations that embodiments have been made. Also, although relatively specific problems have been discussed, it should be understood that the embodiments should not be limited to solving any specific problems identified in the introduction.

A method for combining two thin-film electronic devices is described. In an embodiment, the method includes providing a first thin-film electronic device, the first thin-film electronic device being having a length, height, depth, and a first connecting surface. Additionally, the method includes providing a second thin-film electronic device, the second thin-film electronic device having a length, height, depth a second connecting surface. The method also includes providing a first thin-film conductive substrate with a layer of material deposited onto at least one side of the thin-film conductive substrate. Applying heat to cause reflow of the layer of deposited material occurs in the method. Moreover, positioning the thin-film conductive substrate between the first thin-film electronic device and the second thin-film electronic device to form a pre-press module, wherein the pre-press module has a length and a width occurs in the method. The method further includes applying pressure to the pre-press module to form a combined device in which the first thin-film electronic device and the second electronic device are bonded together and electrically connected, wherein the application of pressure is orthogonal to plane formed by length and width of the pre-press module.

Additionally, a system for combining two thin-film electronic devices is described. The system includes a first rotatable module, the first rotatable module adapted to house a first thin-film electronic device. The system further includes a second rotatable module, the second rotatable module housing a second thin-film electronic device. Also, the system includes a third rotatable module, the third rotatable module adapted to house a thin-film conductive substrate, the thin-film conductive substrate having a layer of conductive material deposited on a top-side and a bottom side. Additionally, a guiding track is disclosed, wherein the guiding track mechanically guides the first thin-film electronic device, a second thin-film electronic device, and a third thin-film electronic device to a roller press, wherein the roller press is configured to receive the first thin-film electronic device, a second thin-film electronic device, and a third thin-film electronic device, and further wherein the roller press applies pressure orthogonal to the plane formed by the first thin-film electronic device, the second thin-film electronic device, and the third thin-film electronic device to form a combined electronic device. The system additionally includes a heating element thermally coupled to the conductive thin-film substrate.

DETAILED DESCRIPTION

Various embodiments are described more fully below with reference to the accompanying drawings, which form a part hereof, and which illustrate example embodiments. However, embodiments may be implemented in many different forms and should not be construed as limited to the embodiments set forth herein. Rather, these embodiments are provided so that this disclosure will be thorough and complete and will fully convey the scope of the embodiments to those skilled in the art. Embodiments may be practiced as methods, systems, or devices. The following detailed description is, therefore, not to be taken in a limiting sense.

Embodiments are directed toward systems, methods, and devices for creating thin-film electronic devices. Although the disclosure presents the embodiments in the context of creating a solid-state lithium battery, it should be noted that the technology is not so limited and can be used for any layered thin-film electronic device including, specifically, electrochromic devices. The disclosure describes a hot-press method which be used to combine two or more thin-film electronic devices, such as a solid-state lithium battery. These methods may allow one to create unique battery architectures. Additionally, the method may offer an alternative method for creating already existing battery architectures.

Figure 1:
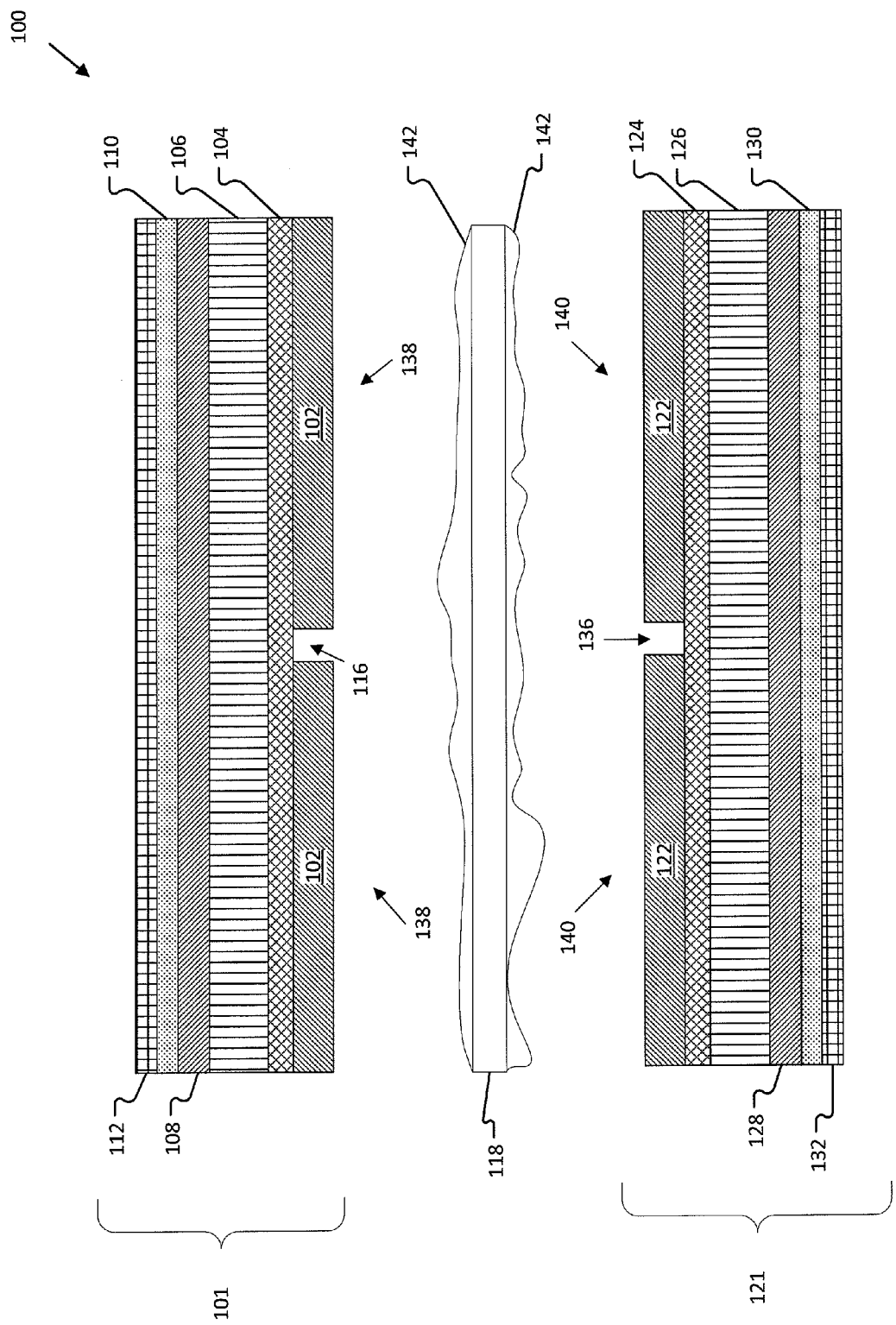
FIG. 1 illustrates an exploded view of a pre-press module.

FIG. 1 illustrates an exploded view of a pre-press module 100. As illustrated, press-press module 100 includes a first target device 101, a second target device 121, and a thin-film conductive substrate 118.

FIG. 1 illustrates the first target device 101 and the second target device 121 with example architectures. It should be noted that other architectures may be used. Additionally, FIG. 1 illustrates the first target device 101 and the second target 121 device having the same architecture. In other embodiments, the architectures are different between the first target device 101 and the second target device 121.

In an embodiment, the first target device 101 includes a substrate 102, to which layers have been deposited. These layers include a cathode contact layer 104, a cathode 106, an electrolyte layer 108, an anode 110, and an anode contact 112.

In embodiments, the substrate 102 layer may be polyethylene terephthalate ("PET"). In other embodiments, the substrate is one of plastic, stainless foil, glass, and ceramic. Any other suitable material, now known or later developed may also be used for the substrate 102.

The cathode contact layer 104 may be a variety of conductive materials such as metal (e.g., gold) or a conductive paste or ink. In the embodiment illustrated, the cathode 106 is in direct contact with the cathode contact 104.

Additionally, the cathode 106 may be a variety of material. For example the cathode contact is a metal oxide in an embodiment. Specifically, the cathode contact may be one of $LiCoO_2$, $LiMn_2O_4$, or $LiFePO_4$.

An electrolyte 108 separates the cathode 106 from the anode 110. Lithium phosphorus oxynitride (LiPON) is an amorphous polymer material that may be used as an electrolyte 108, though any currently known or future material suitable for use as an electrolyte in a thin-film solid state battery may be used.

In the embodiment illustrated, an anode 110 is deposited on the electrolyte 108. The anode 110 may be lithium or another material containing lithium. In various embodiments, the anode 110 acts as the anode contact 112.

In alternative embodiments, a different material is used for the anode contact 112. For example, the anode contact 112 may be nickel or another conductive material such as a metal or a conductive paste or ink.

The second target device 121 includes layers similar to that of the first target device. These layers include a substrate 122, a cathode contact layer 124, a cathode 126, an electrolyte layer 128, an anode 130, and an anode contact 132. These layers have the same or similar properties as the like named layer described with reference to the first target device 101.

Manufacturing of the target devices 101 and 102 may occur in a variety of means. For example layers may be deposited onto a substrate using any number of techniques including but not limited to physical vapor deposition, chemical vapor deposition, thermal evaporation, pulsed laser deposition, sputter deposition, and sol-gel processes.

The first target device 101 has a via 116, and the second target device 121 has a via 126. In an embodiment, via 116 and via 136 are drilled or etched after deposition of other layers. As illustrated, the via 116 has a depth to at least the surface of cathode contact layer 104. Similarly, the via 136 has a depth to at least the surface of the cathode contact 124.

The first target device 101 has a first connecting surface 138, and the second target device 121 a second connecting surface 140. A connecting surface is defined as the surface of the target device that will electrically couple to another target device and physically couple to the thin-film conductive substrate 118. For example, the first target device 101 has a connecting surface 138 that, by application of the hot-press method, will electrically couple to the second connecting surface 140 of the second target device 121. In the embodiment shown, coupling occurs through the use of a thin-film conductive substrate 118. As illustrated, the first target device 101 is in a coupling position relative to the second target device 121 because the connecting surface 138 faces connecting surface 140.

Pre-press module 100 also includes a thin-film conductive substrate 118. The thin-film conductive substrate 118 may be shaped to correspond to the dimensions of the surface of a target device. For example, where the target device has non-conductive gaps, the thin-film conductive substrate may have a corresponding non-conductive gap. Alternatively, the foil may be shaped to have a different pattern than that of the surface of the top layer of a target device.

As illustrated, the thin-film conductive substrate 118 has a layer of material 142 deposited onto both sides of the thin-film conductive substrate 142. For example, a layer of lithium or LiPON may be present on the thin-film conductive substrate. In alternative embodiments, a layer of material 142, such as lithium, may be deposited on the first connecting surface 138 of a first target device 101 and/or a second connecting surface 140 of the second target device 121. The layer of material 142 may be another type of material such as indium, gallium, tin, a conductive polymer and/or a conductive polymer loaded with metal beads. In another embodiment, a material, such as lithium, may be integrated into the thin-film conductive substrate 118, such as an aluminum-lithium foil.

As described above, FIG. 1 depicts a pre-press module configured to stack target devices in parallel. In other embodiments, however, the pre-press module may be configured such that the target devices may be in series. For example, a first target device may have a substrate layer, and a via in the substrate leading to a cathode contact layer. Deposited upon the cathode contact layer is a cathode layer. Deposited upon the cathode layer an electrolyte layer, upon the electrolyte layer is an anode layer. The substrate side that is the connecting surface. Similar to FIG. 1, a conductive substrate with a reflow material may be placed between the second and first target.

In an alternative embodiment, the second target device has a substrate with an anode deposited on the substrate, and electrolyte deposited onto the anode, and a cathode deposited on onto the electrolyte layer. Additionally, the substrate of the second target device is the connecting surface. Thus, in this alternative embodiment, when the devices and the substrate are coupled together in the order of first target device, conductive substrate, second target device, the stack will be in series.

Figure 2:
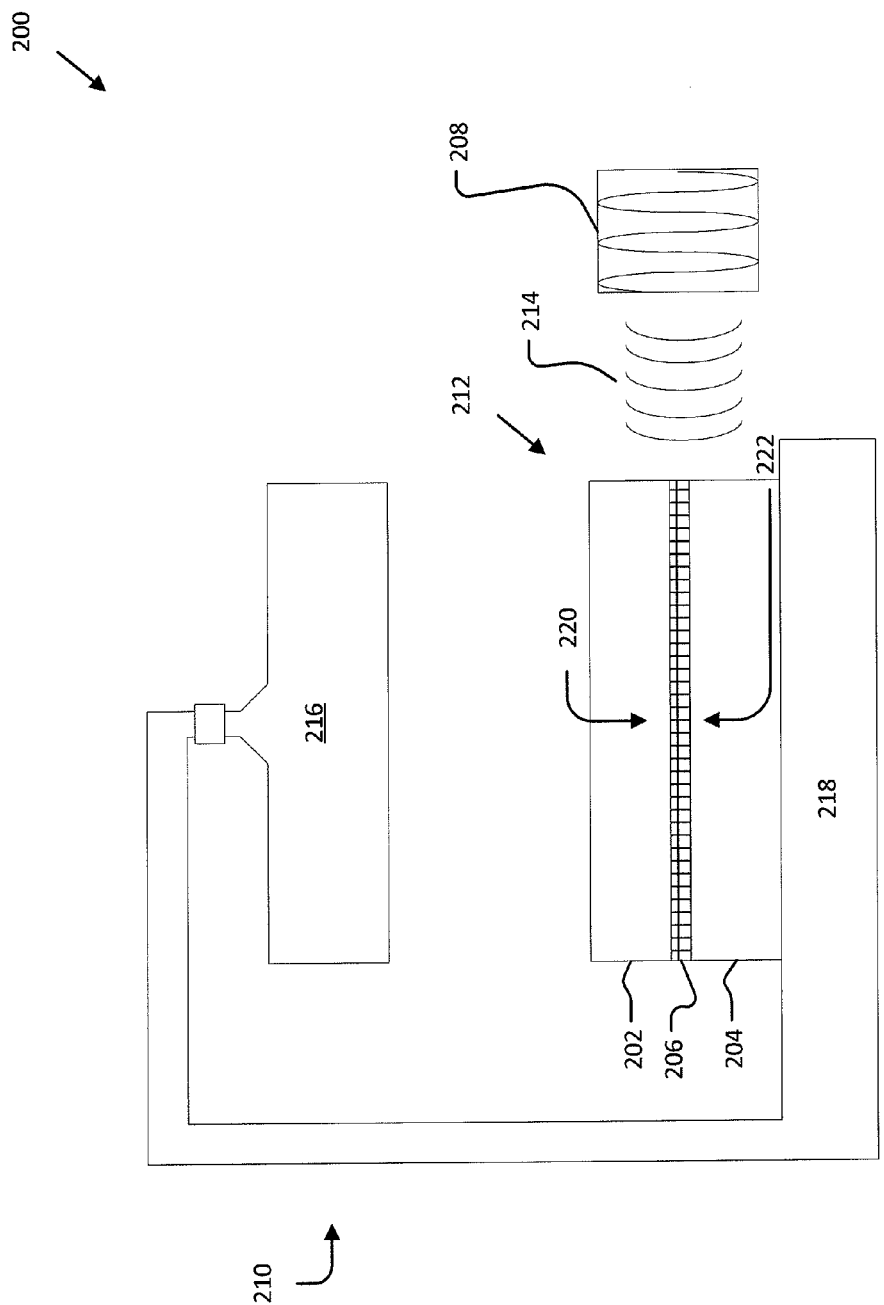
FIG. 2 illustrates an embodiment of a batch system for implementing a hot-press method.

FIG. 2 illustrates an embodiment of a batch system 200 for implementing a hot-press method. As illustrated, the batch system 200 has a first target device 202 and a second target device 204. Between the devices is a thin-film conductive substrate 206. In an embodiment, the thin-film conductive substrate 206 has a layer of material is deposited onto the thin-film conductive substrate 106. System 200 also includes a heating element 208 and a press 210.

The first target device 202 and the second target device 204 are oriented in a coupling position relative to each other. Between the first target device 202 and the second target device 204 is a thin-film conductive substrate 206. When disposed on a press bed, the thin-film conductive substrate 206 has an actuating side 220 and a press bed side 222.

Additionally, FIG. 200 illustrates the second target device 204 being disposed on the press bed 218, the thin-film conductive substrate 206 being disposed on the second target device 204, and the first target device 202 being dispose on the thin-film conductive substrate 202. Prior to the application of mechanical force by the press 210 and heat by the heating element 208, this orientation of a first target device 202, the thin-film conductive substrate 206 and the second target device 204 is known as a pre-press module 212.

The batch system 200 is configured to apply heat to the first target device 202, the second target device 204, and/or the substrate 206. Heat application may be general or localized. As illustrated, a heating element 208 is used to heat the thin-film conductive substrate 206 through heat pathway 214.

In an embodiment, the heating element 208 applies heat sufficient to cause the layer of material deposited onto the thin-film conductive substrate 206, the coupling surface of first target device 202, and/or the coupling surface of second target device 204 to liquefy or, as referred to the art, to reflow. In an alternate embodiment, the heating element 208 may apply heat sufficient to raise the temperature to just below the reflow temperature of a material, allowing the act of pressing the module 212 to provide the final energy necessary to reflow the material. The heating element 208 may generate heat through any means now known or later developed. Accordingly, the heat pathway 214 may be one of conductive, convective, or radiative means. For example, traditional infrared-lamps, electrical current, a hot plate, or other suitable means may be used. Additionally, ultrasonic welders may be used. Indeed, physically pressing the two target devices may create sufficient heat to cause the lithium to reflow. In such an embodiment, the heating element 208 is the press 218.

In an embodiment, one purpose of heating the various parts of the prepress module 212 is to cause the reflow of a material, such as lithium. In the embodiment, the reflow allows the lithium to flow along the surface of a target device. This allows the first target device 202 to couple to the second target device 204 when the two are physically pressed together by means such as the press 210. During cooling, and the lithium solidifies and the two target devices are coupled together. As discussed above, in an alternative embodiment, some of the energy required to reflow the material may be provided by the act of placing the material under pressure by the press. In that embodiment, the amount of heating, if any, may be selected based on ease of handling of the materials prior to the pressing operation. For example, for some materials heating to the reflow temperature before pressing the module 212 may result in a poor distribution of the reflowed material and poor performance of the final module 212.

The press 210 is designed to apply force to one or more target devices such as the first target device 202 and the second target device 204. As illustrated, the mechanical press 210 may has a platen 216 and the press bed 218. The platen 216 is configured to apply pressure to the pre-press module 212. Pressure is applied orthogonal to the plane of the pre-press module. The press bed 218 supports the pre-press module 218 as the platen 216 applies pressure to the pre-press module 212. Actuation may occur using mechanical, pneumatic, or hydraulic means. The amount of pressure may vary, and for certain applications the pressure is around 10-20 lbs/in$^2$.

The module 212 may be constrained (no material is allowed to exit the sides of the module 212 during pressing) or unconstrained (some reflowed material may be squeezed from the module 212) depending on the desired application, final quality, and materials used.

Figure 3:
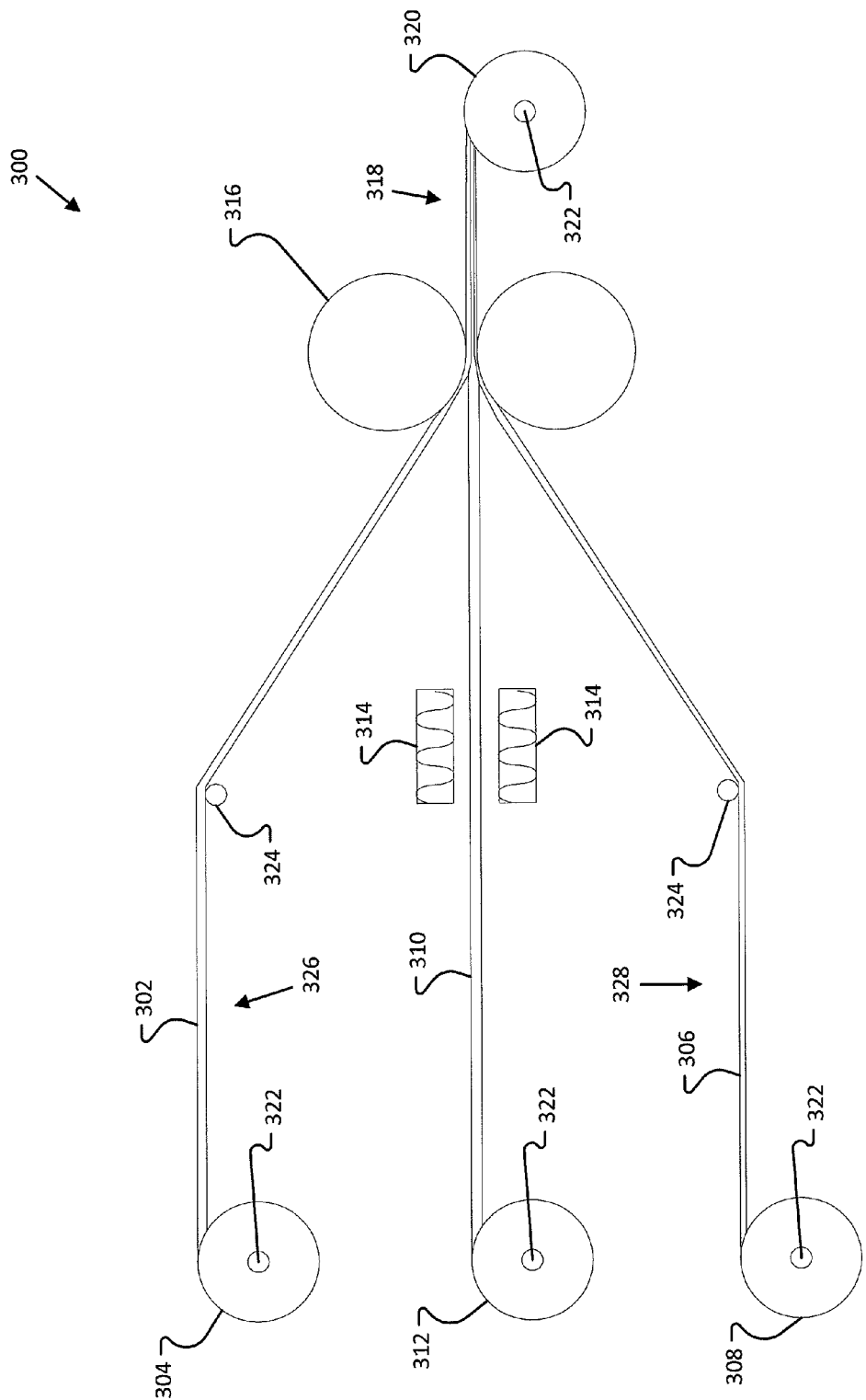
FIG. 3 illustrates embodiment of a roll-to-roll system for implementing a hot-press method.

FIG. 3 illustrates embodiment of a roll-to-roll system 300 for implementing hot-press method. A roll-to-roll system allows the manufacture of multiple devices in a continuous or semi-continuous process. A roll-to-roll system is so named for having a roll housing a web of thin-film devices that translates (i.e., moves) through a system. During translation, one or more processes are performed on the web. At the end of the system, the web is wound or cut into individual devices. This allows for, in certain processes, a faster manufacturing time.

The system 300 causes translation of the first target device web 302 housed on the first target-device spool 304, the second target device web 306 housed on the second target-device spool 308, and the thin-film conductive substrate 310 housed on the conductive-substrate spool 312. Heating element 314 applies heat to the thin-film conductive substrate 310. The first target device web 302, the second target device web 306, and the thin-film conductive substrate 310 are feed into a roll press 316, which applies pressure to the three webs to form a combined device web 318. The combined device web 318 is wound onto a wind spool 320. A guide track or other means may be sued to mechanically support the translation of the webs through system 300.

Though system 300 depicts only two target device webs, other embodiments may have more than two target device webs being combined using the roll-to-roll press system. Still, other embodiments include multiple roll-to-roll systems in series, whereby one combined device is further combined with another combined device or target device.

The first target device web 302, the second target device web 306, and the thin-film conductive substrate 310 may translate through the system 300 at specified rate. In an embodiment, for example, the system 300 translates the first target device web 302, the second target device 306, and the thin-film conductive substrate web 310 at a rate of 12 to 48 inches per minute. This speed may be set to be constant during processing or may vary as needed. Acceleration and deceleration of spools 304, 308, and 312 may be controlled, which may help prevent slack in the spool. Tension of the first target device web 302, the second target device 306, and the thin-film conductive substrate may be set at 10-50 lbf for a 1 meter wide device or substrate.

In an embodiment, to form the combined device web 318, target devices are oriented such that each target device's connecting surface on a web faces a connecting surface of another target device on the opposing device web. For example, the first target device web 302 has a second connecting surface 326 and the second target device web 306 has a second connecting surface 328. As illustrated, the first target device web 302 is spooled onto first-target device spool 304 in such a way that the connecting surface 326 is facing the second target device web 306 as each target device web translates through the system. Similarly, the second target device web 306 is spooled onto the second target device spool 308 in such a way that the second connecting surface 328 faces the first target device web 302.

Further, the thin-film conductive substrate web 310 is oriented between the first target device web 302 and the second target device web 306. The thin-film conductive substrate may have the same properties as those properties described with respect to FIG. 1. Accordingly, the thin-film conductive substrate web 310 may have a layer of material 330 deposited or integrated in it.

Heating elements 314 heats the thin-film conductive substrate web 310 as it translates through the system. The heating elements 314 have properties similar or the same as properties described with reference to the heating element in FIG. 1. In an embodiment, the heating elements 314 are configured to heat a material layer of the thin-film conductive substrate 310, such as lithium. In another embodiment, the heating element heats a layer of material on the connect surface of one or more target devices, such as connecting surface 326 and/or connecting surface 328.

Other heating techniques may be used. For example ambient heat may be applied to the entire system 300. Alternatively, the roll press 316 may be heated. One or more idler rollers 324 may also be heated. Other heating elements may be present, such as heating elements designed to heat a first target device web 302 or a second device web 206. These heating elements may use combined, so that multiple heating elements act on various parts of the system.

As illustrated, system 300 includes a roll press 316. Roll press 316 receives the first target device web 302, the second target device web 306, and the thin-film conductive substrate 310. Pressure is applied to the first target device web 302, the second target device web 306, and the thin-film conductive substrate web 310 to form a combined device web 318. Finished devices may then be cut from the web by any suitable means. In alternative embodiments, a mechanical, hydraulic, or pneumatic press is employed. In such embodiments, formation of the combined device web 318 may occur in a semi-batch manner.

A wind module 320 receives the combined device web 318. Wind module has a mandrel 320 designed to receive the combined device web 318.

As illustrated spools 304, 308, 312, 320 and may have a mandrels 322 on which a target device, a thin-film conductive substrate, or a combined device may be may be spooled. For example, a fully spooled mandrel may have 20" outside diameter and a 6" core, and be 1.2 meters wide.

Various idler rollers 324 may guide the first target device 302, the second target device 308, and the third target device 312. Idler rollers may be designed for removal for periodic cleaning. In embodiments, the idler roller surface roughness may be 8 micro-inch rms. Idler rollers may spin freely, and they may have low rotational inertia. Idler rollers may have active sensors to indicate positive motion.

Figure 4:
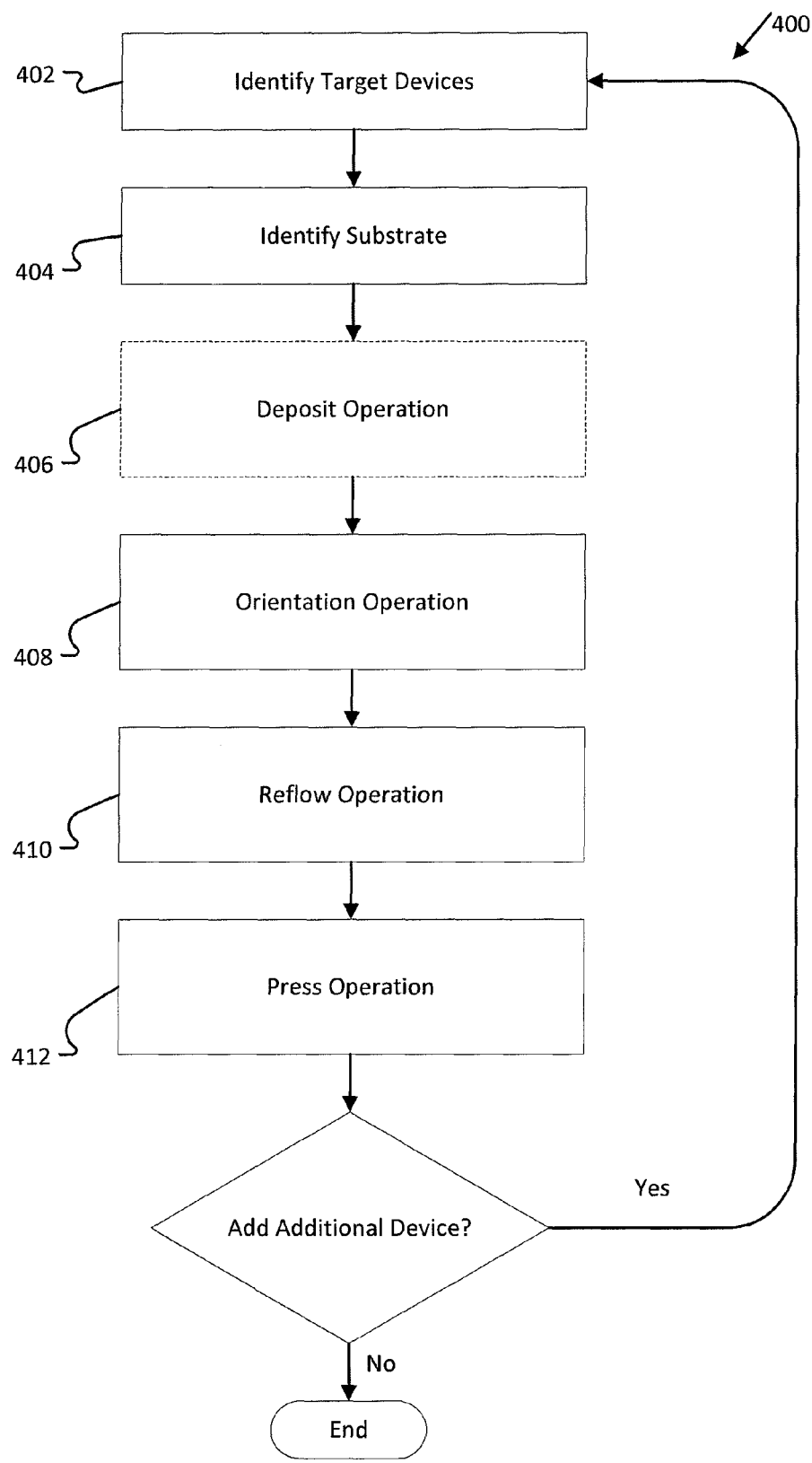
FIG. 4 illustrates an embodiment of a hot-press method for combining two target devices.

FIG. 4 illustrates a method 400 for combining two target devices.

The method 400 begins by identify target devices operation 402, where identification of two or more devices, such as solid-state lithium batteries, occurs. Identification may occur by determining an architecture of a first target device that would be useful to combine with the architecture of a second target device.

The method 400 proceeds to identify substrate operation 404. In this operation, both the material and pattern of the thin-film conductive substrate are identified. For example, one may choose a flexible substrate, such as a metal foil. Alternatively, a rigid or semi-rigid thin-film conductive substrate may be chosen such as a conductive polymer or other suitable material. The pattern of the substrate will also be chosen. For example the shape of the substrate may be determined by the shape of the top layer of the device. This may be useful where the target device surface has non-conducting gaps.

An optional operation of method 400 is deposit operation 406. In deposit operation one or more sides of a thin-film conductive substrate is deposited with a material, such as lithium or LiPON. In alternative embodiments, the material may be deposited on the connecting surface of one or more identified target devices. Alternatively, the material, such as lithium, may be integrated into the thin-film conductive substrate. For example, the thin-film conductive substrate may be an aluminum-lithium foil.

Method 400 proceeds to orientation operation 408. In orientation operation 408, the thin-film conductive substrate is placed between a top layer of a first target device and a top layer of a second target device. Thus, the position of the two devices is such that the substrate of each target device faces outward, the connecting surface of a first target device faces the connecting surface of a second target device, and a thin-film conductive substrate is between the two devices. Devices oriented in such a way are known as pre-press modules.

Method 400 proceeds to reflow operation 410. In reflow operation 410, the thin-film conductive substrate, the deposited layer of material, and/or one more connecting surfaces of a target device may be heated, and the heat is sufficient to cause the lithium layer to liquefy or, as referred to the art, to reflow. The heating may occur prior to the orientation step detailed above. Reflow operation causes a material, such as lithium to reflow. In an embodiment, the temperatures utilized may be between 50 and 200 degrees Celsius.

Method 400 then proceeds to press operation 412. In press operation 412, the thin-film conductive substrate and the two target devices may be physical pressed together. This pressing may be accomplished through a variety of suitable means. For example a mechanical, hydraulic, or pneumatic press may be used. Additionally, a press roller system may be used, whereby the pre-pass modules through two drums that apply sufficient pressure to join the oriented devices. The end result is a contiguous stack with sufficient conductivity and continuous bonding between the surfaces of the target devices. This device may be known as a combined device.

Reflow operation 410 may occur in a variety of ways. For example, heat may be applied prior to press operation 412 or contemporaneous with the application of press operation 412.

The method 400 then proceeds to determine operation 414, where it is determined whether to add a new target device to the combined device. If it is determined that the another device should be added to the combined device, the method 400 returns to step 402, where the combined device is one of the devices to be identified. If it is determined that no other device need be added, the method ends.

Thus, this method may be performed multiple times where a target device it is desirous to create a electrical device with double-sided target device architecture. A double-sided target device is one where the substrate has layers deposited on both sides. As such, one double-sided target device may be combined with another double-sided target device to form a combined device. This combined device may then become a target device in a second hot-press method.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

The invention claimed is:

1. A method for combining two thin-film electronic devices, the method comprising:
    providing a first thin-film electronic device, wherein the first thin-film electronic device is selected from the group consisting of: an electrochromic device, a fuel cell, and a solid state battery, the first thin-film electronic device being having a first length, a first height, a first depth, and a first connecting surface;
    providing a second thin-film electronic device, the second thin-film electronic device having a second length, a second height, a second depth, and a second connecting surface;
    providing a first thin-film conductive substrate with a first layer of deposited material on at least one side of the first thin-film conductive substrate;
    applying heat to cause reflow of the first layer of deposited material;
    positioning the first thin-film conductive substrate between the first thin-film electronic device and the second thin-film electronic device to form a first pre-press module, wherein the first pre-press module has a first pre-press module length and a first pre-press module width; and
    applying pressure to the first pre-press module to form a first combined device in which the first thin-film electronic device and the second thin-film electronic device are bonded together and electrically connected, wherein the application of pressure is orthogonal to plane formed by the first pre-press module length and the first pre-press module width.

2. The method of claim 1, wherein the first layer deposited material is selected from the group consisting of: lithium, indium, and a conducting polymer.

3. The method of claim 1, further comprising:
applying heat to cause reflow of a second layer of deposited material on at least one side of a second thin-film conductive substrate;
positioning the second thin-film conductive substrate between the first combined electronic device and a third thin-film electronic device to form a second pre-press module, wherein the second pre-press module has a second pre-press module length and a second pre-press module width; and
applying pressure to the second pre-press module to form a second combined device, wherein the application of pressure is orthogonal to plane formed by the second pre-press module length and the second pre-press module width.

4. The method of claim 1, wherein the pressure is applied using a mechanical press.

5. The method of claim 1, wherein the application of heat occurs after the formation of the first pre-press module.

6. The method of claim 1, wherein the heat is applied to the first thin-film conductive substrate or the first layer of deposited material.

7. The method of claim 1, wherein applying pressure to the first pre-press module to form a first combined device causes at least some of the material to penetrate at least one of: the first thin-film electronic device or the second electronic device.

8. The method of claim 1, wherein the first connecting surface is coated with lithium.

9. The method of claim 8, wherein heat is applied to the first connecting surface.

10. The method of claim 8, wherein the second connecting surface is coated with lithium.

11. The method of claim 10, wherein heat is applied to both the first connecting surface and the second connecting surface.

12. A method of combining two thin-film electronic devices, the method comprising:
providing a first thin-film electronic device, wherein the first thin-film electronic device includes a first thin-film substrate, a first cathode layer deposited onto the first thin-film substrate, a first electrolyte layer deposited onto the first cathode, and a first anode layer deposited onto the first electrolyte layer;
providing a second thin-film electronic device, wherein the second thin-film electronic device includes a second thin-film substrate, a second cathode layer deposited onto the second thin-film substrate, a second electrolyte layer deposited onto the second cathode, and a second anode layer deposited onto the second electrolyte layer;
providing a thin-film conductive substrate with a layer of deposited material on at least one side of the first thin-film conductive substrate;
positioning the thin-film conductive substrate between the first thin-film electronic device and the second thin-film electronic device to form a pre-press module, wherein the pre-press module has a pre-press module length and a pre-press module width;
applying pressure to the pre-press module to form a combined device in which the first thin-film electronic device and the second thin-film electronic device are bonded together and electrically connected, wherein the application of pressure is orthogonal to plane formed by the pre-press module length and the pre-press module width; and
generating heat such that the layer of deposited material is reflowed.

13. The method of claim 12, wherein the first thin-film electronic device and the second thin-film electronic device are solid state batteries.

14. The method of claim 12, wherein the formation of the combined device results in the first thin-film electronic device and the second thin-film electronic device being electronically connected in series.

15. A method of combining two thin-film electronic devices, the method comprising:
providing a first thin-film electronic device, wherein the first thin-film electronic devices is a first electrochromic device;
providing a second thin-film electronic device, wherein the second thin-film electronic devices includes is a second electrochromic device;
providing a thin-film conductive substrate with a layer of deposited lithium on at least one side of the first thin-film conductive substrate;
generating heat such that the layer of lithium is reflowed;
positioning the thin-film conductive substrate between the first thin-film electronic device and the second thin-film electronic device to form a pre-press module; and
applying pressure to the pre-press module to form a combined device, wherein the application of pressure results in the lithium bonding and electrically connecting the first thin-film electronic device and the second thin-film electronic device.

16. The method of claim 15, wherein applying pressure is done using a mechanical press.

17. The method of claim 15, wherein the generation of heat occurs contemporaneously with the application of pressure.

18. The method of claim 15, wherein the application of pressure occurs using a roll to roll press.

* * * * *